United States Patent [19]

Cimino

[11] Patent Number: 5,718,421
[45] Date of Patent: Feb. 17, 1998

[54] ORBITAL HOLD-DOWN CLAMP

[76] Inventor: Michael A. Cimino, 215 Northridge Dr., Central Square, N.Y. 13036

[21] Appl. No.: 746,121

[22] Filed: Nov. 6, 1996

[51] Int. Cl.$^6$ .................................... B23Q 3/02
[52] U.S. Cl. ...................... 269/138; 269/229; 269/43
[58] Field of Search .................................. 269/138, 229, 269/235, 239, 231, 305, 43

[56] References Cited

U.S. PATENT DOCUMENTS

| | | |
|---|---|---|
| 274,743 | 3/1883 | Du Shane . |
| D. 302,277 | 7/1989 | Bishop . |
| 3,408,924 | 11/1968 | Mueller .................................. 269/138 |
| 3,473,420 | 10/1969 | Boggs .................................. 269/138 |
| 3,747,168 | 7/1973 | Snarskis . |
| 4,139,188 | 2/1979 | Avedian .................................. 269/229 |
| 4,805,888 | 2/1989 | Bishop . |
| 4,955,744 | 9/1990 | Barth et al. . |
| 5,310,299 | 5/1994 | Bernstein .................................. 269/229 |

*Primary Examiner*—Robert C. Watson
*Attorney, Agent, or Firm*—Trapani & Molldrem

[57] ABSTRACT

An orbital hold-down clamp assembly holds a workpiece in place on a platen against a stop or backjaw on the platen. The clamp assembly has four main parts. A screw cam has a threaded shaft and an offset tapered head; a clamp jaw has a distal gripping surface and a foot or fulcrum at the proximal edge; a flat rubber spring is positioned beneath the clamp jaw; and a T-nut mounts in a nest in the platen. The clamp jaw has a tapered opening that matches the taper of the cam head. The nut has a threaded bore that receives the screw shaft of the cam, and a head or top that serves as the base for the fulcrum and the spring. As the screw cam is tightened down, the cam moves the jaw forward against the workpiece, and also pulls the jaw downward into the spring. This rotates the jaw on the fulcrum, gripping the workpiece and urging it downward. Fixtures are provided for forming the T-nut and the screw cam so that each have a predetermined, repeatable angular relationship with respect to the associated screw thread.

7 Claims, 5 Drawing Sheets

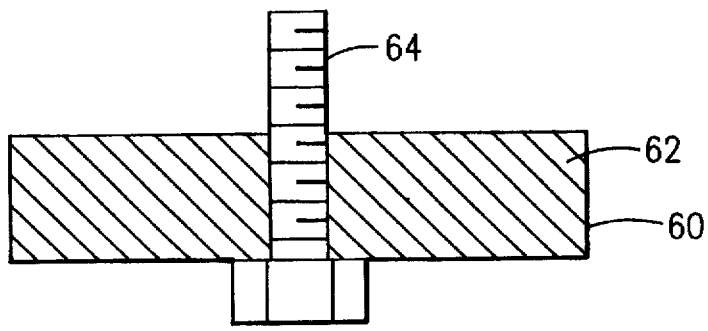
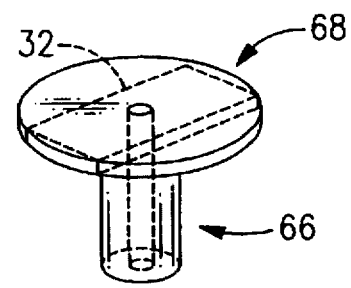
FIG.8  FIG.9
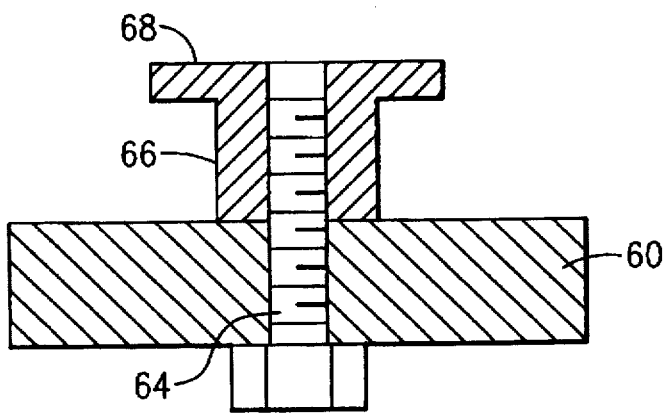
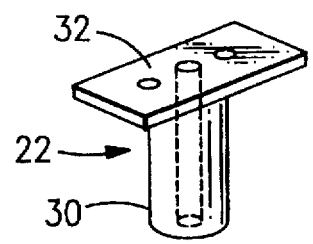
FIG.10  FIG.11

5,718,421

ORBITAL HOLD-DOWN CLAMP

BACKGROUND OF THE INVENTION

This invention relates to clamping devices for holding workpieces for manufacturing or machining, and is more specifically directed to orbital clamps in which a cam with an eccentric or off-axis head urges a clamping jaw against the workpiece to hold it in place.

In modern manufacturing techniques, numerically controlled tools are frequently employed for precision machining of parts or elements. The workpieces are clamped in place at respective clamping stations on the platen or pallet. To accomplish this, a workpiece or a number of blanks or workpieces are clamped in place on a platen or pallet, and the pallet is automatically brought to one or more machining stations to work the blanks or workpieces. The means for clamping need to be both secure enough to hold the part in place for machining and also simple enough so that the parts can be easily removed after machining and replaced with new blanks or workpieces.

One clamping system that can favorably be employed is the so-called orbital clamp, and an example of such an orbital clamp is described in U.S. Pat. No. 4,805,888. In the orbital clamping system, a screw threaded member has a cam head that is offset from the axis of the screw shaft. The clamp jaws, which can be hex shaped, have a bore that receives the eccentric screw head. When the screw cam is tightened down, the cam head rotates to push the clamp jaw member against the workpiece. To remove the finished workpiece, the screw cam is simply rotated in the other direction, and the clamp jaw member cams away from the workpiece. The orbital clamp can have a conic countersunk bore and the cam can have offset an cam head that is tapered or conic in shape. With this arrangement, turning down the screw cam both cams the clamp jaw onto the workpiece and also pulls the clamp jaw downwards.

While this system does have the advantages of simplicity and relatively low cost, there are some drawbacks to the orbital clamping system as it exists at present. Generally, little or no attention has been paid to the angular orientation of the screw thread relative to the cam. Orbital clamps with offset cam heads may not lock down in the position that cams the clamp jaw into the workpiece. As a result, the cam may tighten down before the movable jaw engages the workpiece. This means that the workpiece is not held down or is only held weakly, and will work loose from vibration or other stresses.

OBJECTS AND SUMMARY OF THE INVENTION

Accordingly, it is an object of this invention to provide a clamp arrangement that avoids the drawback of the prior art.

It is another object to provide a threaded eccentric cam for securing a clamp jaw against a workpiece, and which locks down in the position where the clamp jaw is cammed against the workpiece.

It is another object to provide an orbital clamp arrangement in which the clamp jaw pulls the workpiece downward against the platen or pallet.

It is a further object to provide a multiple of screw cams and corresponding T-nut fittings or receptacles that all have an identical specific angular relation relative to the associated threads, so that the screw cams can be used interchangeably with any of the various T-nut fittings.

In accordance with an aspect of the present invention, an orbital hold-down clamp assembly for holding a workpiece in place on a platen comprises a backjaw on the platen positioned to abut a back side of the workpiece, a threaded screw-down cam member, and a threaded receptacle positioned in the platen at a front side of the workpiece to receive the shaft of the threaded screw-down cam member. A clamping jaw is positioned at the front side of the workpiece and has a conic bore adapted to receive the conic cam head of the cam member. A distal edge of the clamping jaw biases against the front side of the workpiece. In a favorable embodiment, a fulcrum member disposed on a proximal side of the clamping jaw and an elastomeric spring pad is situated below the clamping jaw. A fixture T-nut, which can have a female-threaded bore in its shaft, nests in a recess in the platen or pallet and defines the position of the orbital clamp. The screw cam has its tapered or conic head offset from the axis of its shaft. The fulcrum member causes the clamping jaw member to rock downwards as the screw cam is turned, so that the distal edge of the clamping jaw member pulls the workpiece downward as the cam member is tightened down. In a preferred embodiment, the fulcrum member comprises a heel formed on a proximal side of the clamping jaw member.

Also, the cam member and the fitting T-nut have their respective threads oriented in a matching fashion such that the cam member moves the jaw member to engage the jaw member against the workpiece with the cam high point between dead center alignment positions away from and towards the workpiece. The forward or distal part of the cam taper is pushed against the forward or distal part of the clamping jaw taper. Then, further rotation causes the clamping jaw member to cam downwards, pivoting about the fulcrum. This arrangement permits good clamping down over a wide tolerance in workpiece dimensions.

The above and many other objects, features, and advantages of this invention will become apparent to persons skilled in the art from the ensuing description of a preferred embodiment, which is to be read in conjunction with the accompanying Drawing.

BRIEF DESCRIPTION OF THE DRAWING

FIG. 8 is a sectional elevation of a fixture for manufacturing the T-nut fitting of this embodiment.

FIG. 9 is a round blank for forming the T-nut fitting.

FIG. 10 is a sectional elevation of the fixture with the round blank in place thereon.

FIG. 11 is a perspective view of the finished T-nut fitting.

DETAILED DESCRIPTION OF THE PREFERRED EMBODIMENT

Figure 1:
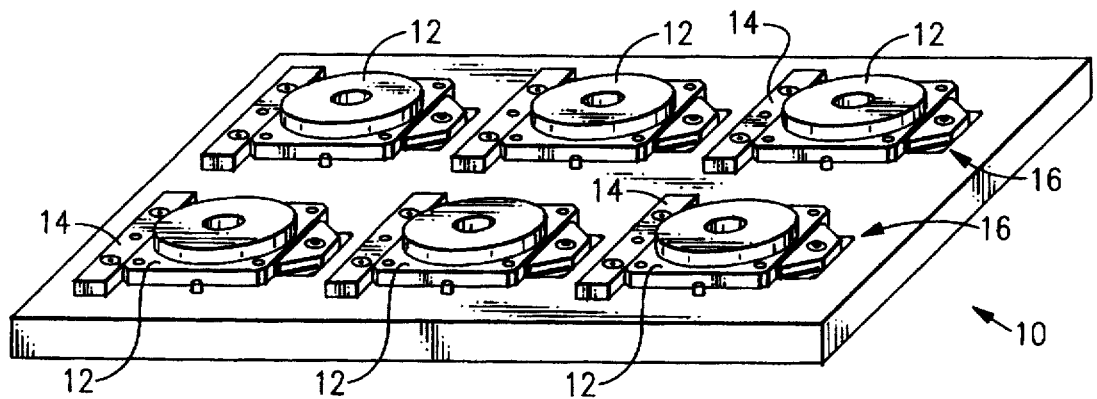
FIG. 1 is a perspective view of a platen or pallet, holding multiple workpiece at respective clamping stations.

With reference to the Drawing, and initially to FIG. 1 thereof, a platen or pallet 10 is configured to hold down an array of workpieces 12. In this example, the workpieces 12 are rectangular metal plates with an annular protuberance that is to be milled in a numerically controlled milling machine. However, the workpieces can be castings, parts, or blanks and can be of any shape or material that is to be worked to form an finished piece. The workpieces are held in place on the platen 10 at respective clamping stations, which are each defined between a back jaw 14 and a fixture clamp 16. The fixture clamps 16 are cam actuated, and can be tightened or loosened with a torque applicator tool, such as a hex wrench.

Figure 2:
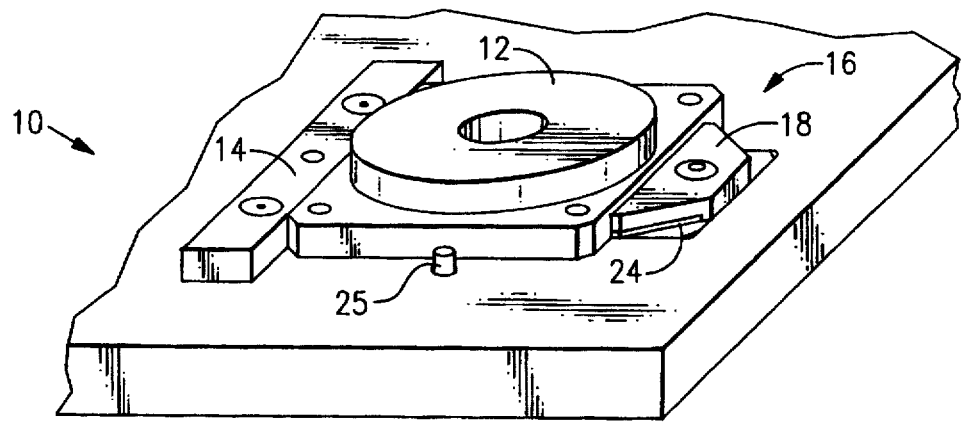
FIG. 2 is an enlarged view of a clamping station according to one preferred embodiment
Figure 3:
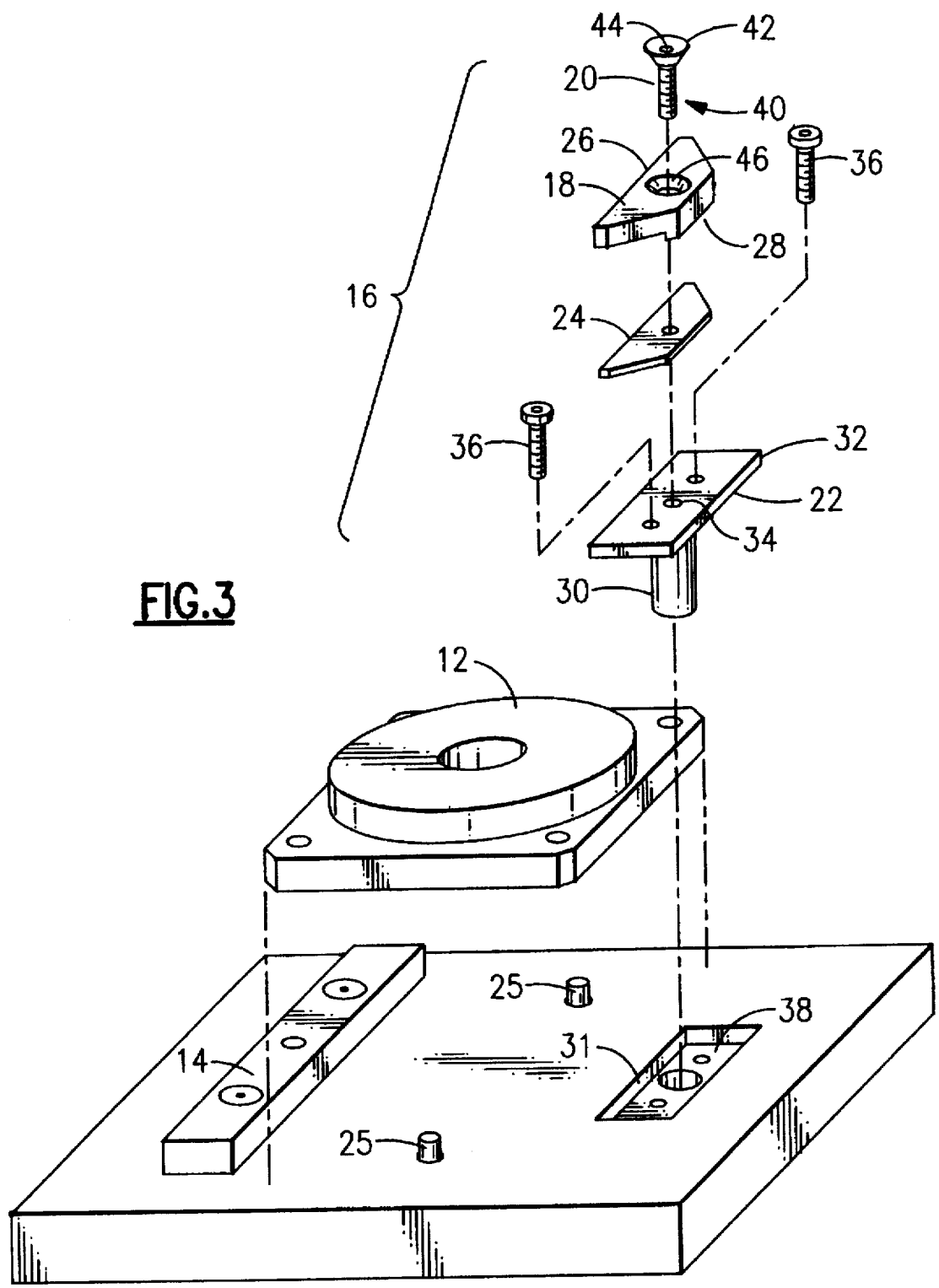
FIG. 3 is an exploded view of the clamping arrangement according to this embodiment.

As shown in more detail in FIG. 2 and in the exploded view of FIG. 3, the fixture clamp 16 includes a clamping jaw 18, which in this embodiment is generally trapezoidal in shape, and which is held in place by a threaded cam 20 that is in turn fitted to a T-nut 22. A flat resilient spring 24, e.g. a sturdy rubber-like material, is positioned below the clamping jaw.

In this embodiment there are locating pins 25 affixed into the platen to bar transverse displacement of the workpiece 12. These would be omitted where the sides of the workpiece itself are to be machined.

In this embodiment, the trapezoidal clamping jaw 18 has a gripping front or distal surface 26 that contacts a front edge of the workpiece 12, and a foot 28 formed on the lower surface of the jaw 18 at its proximal edge. This foot 28 serves as a fulcrum, as described shortly.

The T-nut 22 has a post 30 that fits into a nest 31 in the platen 10, and a T-head 32 that rests in the platen and serves as a supporting surface for the spring 24 and the foot or fulcrum 28 of the clamping jaw 18. A female threaded bore 34 extends through the post 30 and head 32 to receive the cam 20. A recess 38 at the clamping location receives and positions the T-head 32 of the nut. Optionally, this can be a sunken recess with shoulders, if the clamp jaw is to grip thinner workpieces.

As shown in FIG. 3, the cam 20 has a threaded shaft 40 that fits into the bore 34, and a cam head 42 having a hex fitting 44 to accommodate a hex wrench. This head is conic or tapered, and eccentric or offset with respect to the axis of the shaft 40. The clamp jaw 18 has a corresponding conic or tapered bore 46 in which the cam head 42 is seated.

Figure 4A:
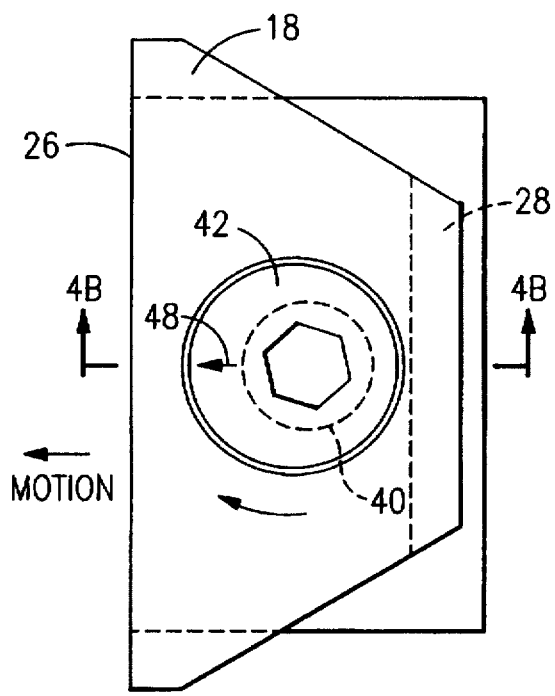
FIG. 4A and 4B are a plan view a sectional elevation, respectively, showing the clamping jaw of this embodiment in a locked or cammed position.
Figure 4B:
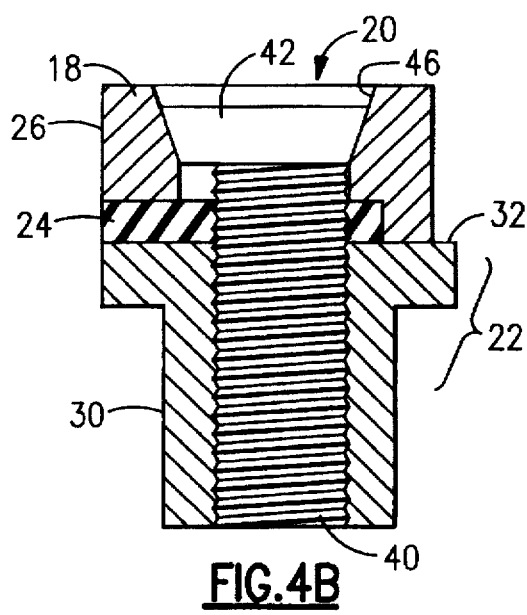

The clamping action of this arrangement can be explained now with reference to FIGS. 4A and 4B. After the workpiece is located in place in the clamping station, the cam 20 is rotated (here, clockwise) for about one-half turn. This rotates the eccentric head 42 in the bore 46 to push the clamping jaw 18 distally, and wedges the workpiece 12 into the stop or backjaw. At the same time, the screw action draws the clamp jaw 18 downwards and the forward or distal edges of the cam and jaw tapers meet. This pulls the jaw member down, pivoting about the fulcrum 28. This compress the spring 24 and rotates the face 26 down to grip the proximal surface of the workpiece. This arrangement will accept parts with a tolerance range of 0.025 mil or more.

Figure 5A:
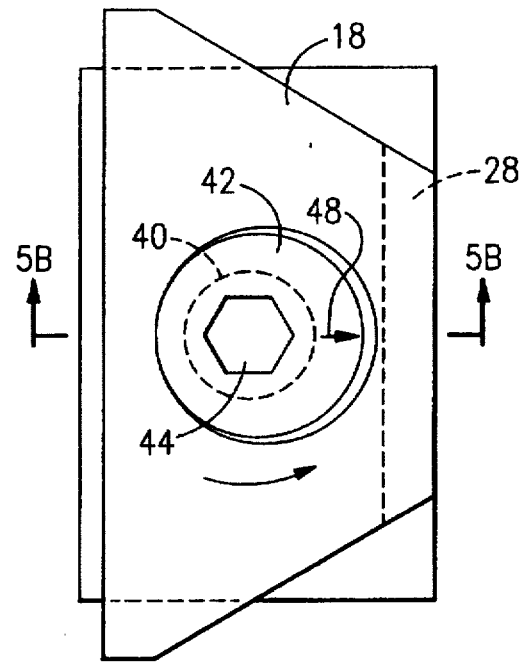
FIGS. 5A and 5B are a plan view and a sectional elevation, respectively, of the clamping jaw shown in a release position.
Figure 5B:
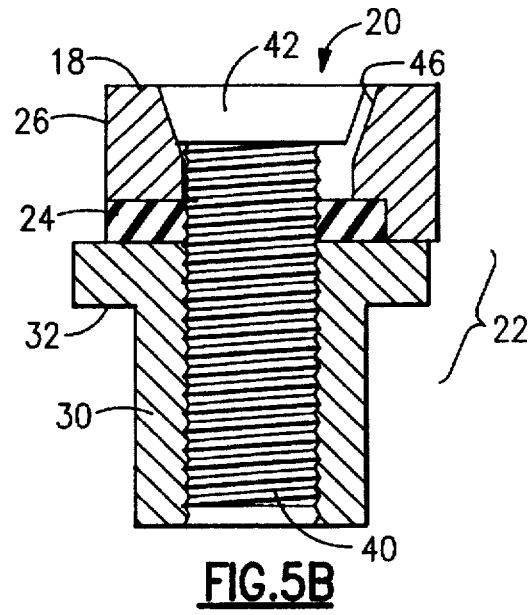

To remove the workpiece, a wrench is inserted into the hex fitting 44 and the cam 20 is rotated counterclockwise, as shown in FIGS. 5A and 5B, until the high point 48 is oriented away from the workpiece 12. This involves mining the cam 20 to orient the high point away from the workpiece. As shown, this allows the clamp jaw 18 to rotate up, under urging of the spring 24, and also moves the clamp jaw 18 proximally and away from the proximal edge of the workpiece.

In order to ensure that the cam 20 will lock down in the position shown in FIG. 4A, the cam is formed so that the offset direction of the head 42 is in a predetermined angular relation to the thread start on the shaft 40. It is also necessary to ensure that T-nut 22 has the thread start in its threaded bore 34 in a predetermined angular relation to the T-head 32. This is accomplished by making up the cam 20 and the T-nut 22 as described and shown as follows.

Figure 6A:
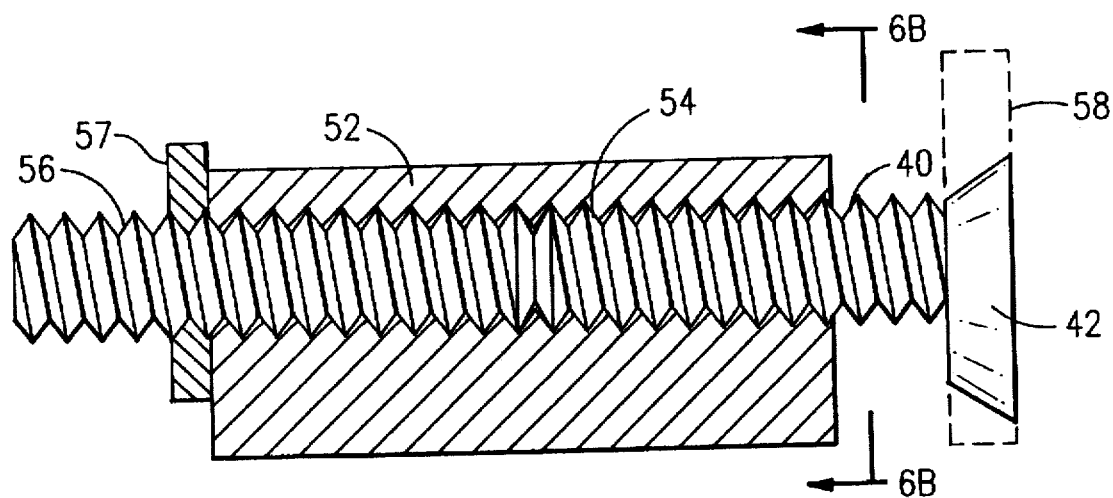
FIGS. 6A and 6B are side and cross sectional views of a fixture for manufacturing the cam screw of this embodiment.
Figure 6B:
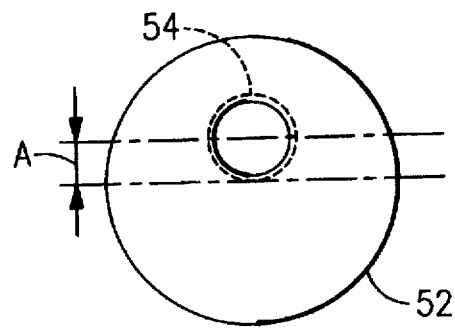
Figure 7:
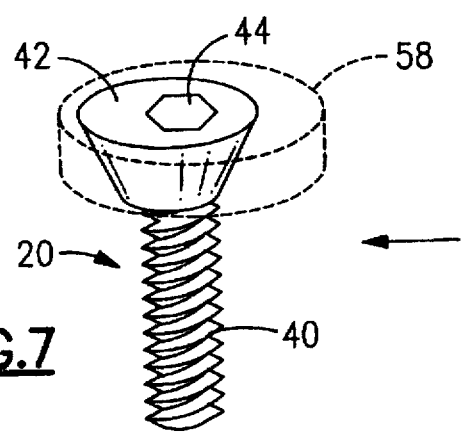
FIG. 7 is a perspective view of the cam screw of this embodiment.

An offset fixture 52 for use in forming the cam 20 is shown in FIGS. 6A and 6B. This fixture is of round stock, with an offset threaded bore 54 running axially through it. There is a prescribed amount of offset A between the center of the bore 54 and the center of the fixture 52. A screw 56 is emplaced in the far end of the bore 54 to a desired depth and is locked in place with a locking nut 57. Then a threaded stock 58 is screwed into place in the fixture 52, as shown. This stock 58 initially has a round head 59, shown in dashed lines. The stock 58 is turned, e.g., on a lathe, about the axis of the fixture 52. This removes the excess of the stock, producing the cam 20 (FIG. 7) with its offset tapered head 42, with the high point having a precise and repeatable angular relationship to the thread orientation of the shaft 40.

To form the T-nut 22, a fixture 60 is employed as shown in FIG. 8, comprising a fixture plate 62 with a belt or threaded stud 64 protruding through the plate. A threaded blank 66, having a round head 68, as shown in FIG. 9, is installed upon the stud 64 and rotated until it rests on the plate 64, as shown in FIG. 10. Then the round head 68 is cut and milled (see dotted lines in FIG. 9) to produce the finished T-nut 22 as shown in FIG. 11. The finished nut has the thread start of the bore 34 in a precise, predetermined and repeatable angular relation with respect to the rectangular T-head 32. The head 32 can also be provided with an index so that it is properly oriented in the nest 31 when it is installed. As an alternative to this embodiment, the fulcrum 28 can be formed on a proximal edge of the head 32, rather than as a foot on the jaw 18.

Because the cams 20 and T-nuts 22 all are manufactured on these fixtures, the cams all have the same angular orientation of the head offset to the shaft thread from cam to cam, and the T-nuts also all have the same angular orientation of the T-head to the bore thread from nut to nut. Consequently, the clamping jaws all cam against the workpiece in identical fashion when the cam screw is locked down. Moreover, the screw cams can be interchanged with one another because of the predetermined orientation of the screw thread to head offset. The T-nuts are also interchangeable with one another for the same reason.

While the invention has been described in detail with respect to one preferred embodiment, it should be recognized that there are many alternative embodiments that would become apparent to persons of skill in the art. While a trapezoidal clamp jaw is shown here, the clamp jaw could have any shape, or could be configured to conform to irregular shapes of workpieces. The spring as shown here serves to hold the front of the clamp jaw up and off the nut. The spring could be metal, or a mechanical or hydraulic mechanism could be substituted. Also, the pallet or platen could be set up with pairs of clamping stations set up back to back with a single backjaw member. Many modifications and variations are possible which would not depart from the scope and spirit of this invention, as defined in the appended claims.

I claim:

1. Orbital hold-down clamp assembly for holding a workpiece in place on a platen comprising backjaw means on said platen positioned against a side of said workpiece for retaining said workpiece in position on the platen;

a threaded screw-down cam member having a threaded shaft with an axis, and a conic cam head that is offset from the axis from the shaft;

threaded receptacle means positioned in said platen at a front side of said workpiece to receive the shaft of said threaded screw-down cam member;

a clamping jaw positioned at said front side of said workpiece and having a conic bore adapted to receive the conic cam head of said cam member and having a distal edge that biases against the front side of said workpiece; and a fulcrum member positioned at a proximal side of said clamping jaw, and proximally of the conic bore thereof, to cause said clamping jaw member to rock downwards so that the distal edge thereof pulls said workpiece downward as said cam member is tightened down.

2. Orbital hold-down clamp assembly for holding a workpiece in place on a platen comprising backjaw means on said platen positioned against a side of said workpiece for retaining said workpiece in position on the platen;

a threaded screw-down cam member having a threaded shaft with an axis, and a conic cam head that is offset from the axis from the shaft;

threaded receptacle means positioned in said platen at a front side of said workpiece to receive the shaft of said threaded screw-down cam member;

a clamping jaw positioned at said front side of said workpiece and having a conic bore adapted to receive the conic cam head of said cam member and having a distal edge that biases against the front side of said workpiece;

a fulcrum member positioned at a proximal side of said clamping jaw to cause said clamping jaw member to rock downwards so that the distal edge thereof pulls said workpiece downward as said cam member is tightened down; and a resilient spring member positioned beneath the clamping jaw.

3. The clamp assembly of claim 1, wherein said fulcrum member comprises a heel formed on a proximal side of said clamping jaw.

4. Orbital hold-down clamp assembly for holding a workpiece in place on a platen comprising backjaw means on said platen positioned against a side of said workpiece for retaining said workpiece in position on the platen;

a threaded screw-down cam member having a threaded shaft with an axis, and a conic cam head that is offset from the axis of the shaft so as to define a cam high point where the conic surface is most distant from said axis;

threaded receptacle means positioned in said platen at a front side of said workpiece to receive the shaft of said threaded screw-down cam member; and a clamping jaw positioned at said front side of said workpiece and having a conic bore adapted to receive the conic cam head of said cam member and having a distal edge that biases against the front side of said workpiece;

wherein said receptacle means comprises a fitting nut adapted to seat into a suitable nest in said platen, including a head member and a post member positioned beneath the head member and having a threaded bore to receive said threaded shaft, and wherein said bore has its thread arranged in a predetermined angular orientation relative to the thread of said shaft such that when said cam member is rotated the clamping jaw engages said workpiece and the cam head rests in the conic bore of said clamping jaw member with the distal sides of said cam head and bore forcibly biasing against one another.

5. The clamp assembly of claim 4, wherein said fitting nut has its head member on an upper part of post and the associated nest in said platen has an upper recess to receive said head member, and a lower recess to receive said post.

6. The clamp assembly of claim 4, wherein said fitting nut is a T-nut, and said head member is transversely elongated.

7. The clamp assembly of claim 1 wherein said clamping jaw has a trapezoidal shape, with said distal edge being longer than proximal side.

\* \* \* \* \*